US005165195A

United States Patent [19]

Matsui

[11] Patent Number: 5,165,195
[45] Date of Patent: Nov. 24, 1992

[54] FLOAT FOR FISHING OPERATION

[76] Inventor: Tetsu Matsui, 1-2-14-305, Nakanishi, Murocho, Toyohashi-shi, Aichi-ken, Japan

[21] Appl. No.: 635,252

[22] Filed: Dec. 28, 1990

[30] Foreign Application Priority Data

Aug. 31, 1990 [JP] Japan .............................. 2-92030[U]

[51] Int. Cl.$^5$ ................................ A01K 91/04
[52] U.S. Cl. ..................... 43/43.1; 43/44.9; 43/44.95
[58] Field of Search ............. 43/43.1, 44.87, 44.9, 43/44.91, 44.92, 44.95, 4.5

[56] References Cited

U.S. PATENT DOCUMENTS

| 1,243,881 | 10/1917 | Sanford | 43/44.95 |
| 2,492,033 | 12/1949 | Cherriere | 43/43.1 |
| 2,724,206 | 11/1955 | Miller | 43/43.1 |
| 5,014,459 | 5/1991 | Sublet | 43/43.1 |

Primary Examiner—Kurt Rowan
Attorney, Agent, or Firm—Spencer, Frank & Schneider

[57] ABSTRACT

A float for a fishing operation including a cylindrical column-shaped float body, conical end portions projecting outward of opposite ends of the float body, at least first and second through holes and a guide line for securing a fishing line to the float by pulling the guide line through the first and second through holes. The first through hole extends slantwise from the apex of one conical end portion to the cylindrical peripheral surface of the float body, while the second through hole extends slantwise from the apex of the other conical end portion to the cylindrical peripheral surface of the float body. The guide line is folded back to assume a two-line arrangement while forming a small loop at its foremost end. The foremost end of the fishing line is engaged with the loop of the guide line. Then, the fishing line is introduced through the first and second through holes by pulling the guide line, whereby the fishing line is firmly secured to the float at a required position.

6 Claims, 3 Drawing Sheets

FLOAT FOR FISHING OPERATION

BACKGROUND OF THE INVENTION

1. Field of the Invention

The present invention relates generally to a float preferably employable for a mountain stream fishing operation. More particularly, the present invention relates to an improvement of the float for a fishing operation wherein a fishing line is firmly secured to a float body at a required position with the aid of a guide line.

2. Description of the Related Art

As is well known, a float, a marker or the like is usually used for a fishing operation as means for visually recognizing a bite which is caused by a fish in the water.

Generally, the float is secured to a fishing line at a suitable position determined in proper consideration of the depth of a fishing site such that it floats on the water surface or it assumes a predetermined height above the water surface. The position of the float on the fishing line is adjusted by the fisherman via a fishing rod so as to allow a bait to naturally flow in conformity with the flowing of the stream.

Usually, a fishing assembly (normally comprising a float, a weight, a hook and a bait) is prepared by the fisherman himself at a fishing site prior to a fishing operation. Especially, with respect to the float, he properly determines what kind of float should be selected, while visually confirming the present state of the fishing site. Once a certain float is selected, it is required that the float is secured to a fishing line at a correct position while taking account of the visually measured or estimated depth of the fishing zone.

To facilitate understanding of the present invention, typical conventional floats will briefly be described below with reference to FIGS. 6(a) to (d).

FIG. 6(a) shows a float 11 adapted to float on the water surface. The float 11 includes a shaft 9 onto which a rubber tube 10 is fitted so as to allow a fishing line 12 to pass through the rubber tube 10 along the shaft 9. The position of the float 11 is adjusted by the fisherman by slidably displacing the rubber tube 10 relative to the fishing line 12.

FIG. 6(b) shows a ball-shaped float 13 which is formed with a central through hole 13a. A fishing line 14 extend through the central hole 13a twice while a part of the fishing line 14 extends along the semispherical surface of the float 13. The position of the float 13 is adjusted by largely loosening the fishing line 14 and then pulling the float 13 in the required direction with the fishing line 14 firmly held in one hand of the fisherman.

FIG. 6(c) shows a marker 16 which serves also as a float. The marker 16 is formed with a central through hole so that a fishing line 15 extends through the central hole and a fixing rod 17 in the form of a toothpick is inserted into the central hole to serve as a wedge for fixedly holding the fishing line 15 in the central hole. The position of the marker 16 is adequately adjusted by removing the fixing rod 17 and then slidably displacing the marker 16 along the fishing line 15.

FIG. 6(d) shows a thin plate-shaped marker 18 which serves also as a float. The marker 18 is formed with two holes 18a through which a fishing line 19 is inserted for the purpose of firmly holding the fishing line 19 with the aid of the holes 18a. The position of the marker 18 is adjusted by largely loosening the fishing line and pulling the marker 18 in the required direction with the fishing line firmly held by one hand of the fisherman.

When the float or the marker is to be secured to the fishing line, a time-consuming operation is performed for causing the fishing line to be inserted through one or more through holes having a very small diameter on the float or marker, with the exception of the float 11 shown in FIG. 6(a).

However, since the through hole or holes are usually formed with a very small diameter as mentioned above, an operation for securing a fishing assembly (normally comprising a float, a hook, a weight and a bait) is not always easily performed at the fishing site under good environmental conditions (especially where the fishing line is blown away by a strong wind or the fishing operation is performed before dawn).

Particularly, when a mountain stream fishing operation is performed for chars, trouts similar fish, a NO. 0.8 fishing line (0.148 mm in diameter) or a NO. 0.5 fishing line (0.117 mm in diameter) having a small or diameter is usually used. Accordingly, it is not easy for a fisherman to insert the fishing line through the small hole or holes especially under the slightly dark condition encountered just before dawn.

SUMMARY OF THE INVENTION

The present invention has been made with the foregoing background in mind.

An object of the present invention is to provide a float for a fishing operation which makes it easy for a fishing line to be secured to a float body at a required position.

Another object of the present invention is to provide a float for a fishing operation which makes it simple for a fisherman to properly adjust the position where the fishing line is secured to the float body.

To accomplish the above objects, the present invention provides a float for a fishing operation wherein the float comprises a cylindrical column-shaped float body, conical end portions projecting outward of opposite ends of the float body, at least a first through hole and a second through hole, the first through hole extending slantwise from the apex of one conical end portion to the cylindrical peripheral surface of the float body, a second through hole extending slantwise from the apex of the other conical end portion to the cylindrical peripheral surface of the float body, a guide line folded back to assume a two-line arrangement while forming a small loop at the foremost end thereof, the guide line being inserted through the first through hole and the second through hole until the loop is projected outward of the apex of the other conical end portion so that the foremost end of a fishing line is engaged with the loop of the guide line, the fishing line being introduced through the first and second through holes by pulling the guide line with fisherman's fingers, whereby the fishing line is secured to the float at a required position.

It is desirable that the cylindrical column-shaped float body be molded of a spongy light synthetic resin, e.g., a porous styrene resin.

To assure that the fisherman can easily recognize the float on the water surface of a mountain stream, it is desirable that the float be colored with a readily visually sensible color.

Other objects, features and advantages of the present invention will become apparent from reading the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments of the present invention.

Figure 1:
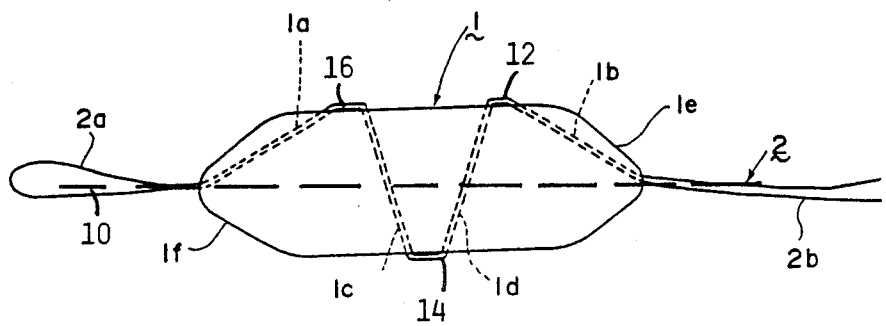
FIG. 1 is a front view of a float for a fishing operation in accordance with an embodiment of the present invention.

FIG. 1 is a front view which shows a float for a fishing operation in accordance with an embodiment of the present invention, wherein the float is formed with four through holes to be described later.

A float body 1 having a longitudinal axis 10 is designed in a cylindrical configuration, and opposite end parts of the float body 1 are tapered in a conical configuration, respectively. A spongy light synthetic resin, e.g., a porous styrene resin is preferably employable as a raw material for the float body 1. The conical portion 1e of the float body 1 is formed with a through hole 1b which extends slantwise from the apex of the conical portion 1e to a point 12 on the peripheral surface of the cylindrical portion of the float body 1. In addition, the cylindrical portion of the float body 1 is formed with a through hole 1d which extends slantwise from the the vicinity of the opening of the through hole 1b at point 12 on the peripheral surface of the cylindrical portion of the float body 1 to a point 14 opposite to the foregoing one 12 on the peripheral surface of the cylindrical portion of the float body 1. Conical portion 1a is similar with the exception that through holes 1a and 1c are formed in the opposite direction to that of the through holes 1b and 1d, through hole 1a intersecting the peripheral surface of the cylindrical portion of float body 1 at a point 16 and the ends of through hole 1c being in the vicinity of points 14 and 16.

The through holes 1a to 1d may be preformed through the float body 1. In practice, it is recommended that they be formed through the float body 1 at the same time that a guide line 2 is inserted through the float body 1 by utilizing a suitable needle-shaped tool (not shown).

The guide line 2 is folded back to assume a two-line arrangement such that its foremost end part forms a small loop to serve as a fishing line engagement portion 2a to be described later. The guide line 2 is inserted through the float body 1 in the two-line arrangement state in the following manner. First, the guide line 2 enters the apex of the conical portion 1e and slantwise advances while forming the through hole 1b until it is drawn outward of the peripheral surface of the cylindrical portion of the float body 1. Then, the guide line 2 enters the cylindrical portion of the float body 1 at the position in the vicinity of the opening of the through hole 1b and slantwise advances while forming the through hole 1d until it is drawn outward of the peripheral surface of the cylindrical portion of the float body 1 at the opposite location to the foregoing one. Subsequently, the guide line 2 enter the cylindrical portion of the float body 1 at the position in the vicinity of the opening of the through hole 1d and slantwise advances while forming the through hole 1c until it is drawn outward of the peripheral surface of the cylindrical portion of the float body 1 at the opposite location to the foregoing one in the same manner as mentioned above. Thereafter, the foremost end part of the guide line 2 which has been drawn outward of the peripheral surface of the cylindrical portion of the float body 1 is drawn from the apex of the other conical portion 1f while forming the through hole 1a. When the foremost end part of the guide line 2 is drawn outward of the through hole 1a by a certain distance, a small loop is formed with the drawn guide line 2. The thus formed loop serves as a fishing line engagement portion 2a.

To assure that vertical movement of the float body 1 can easily visually be recognized by a fisherman from a remote location, it is recommended that a specific color, e.g., an orange be selectively employed for the float body 1.

Figure 2:
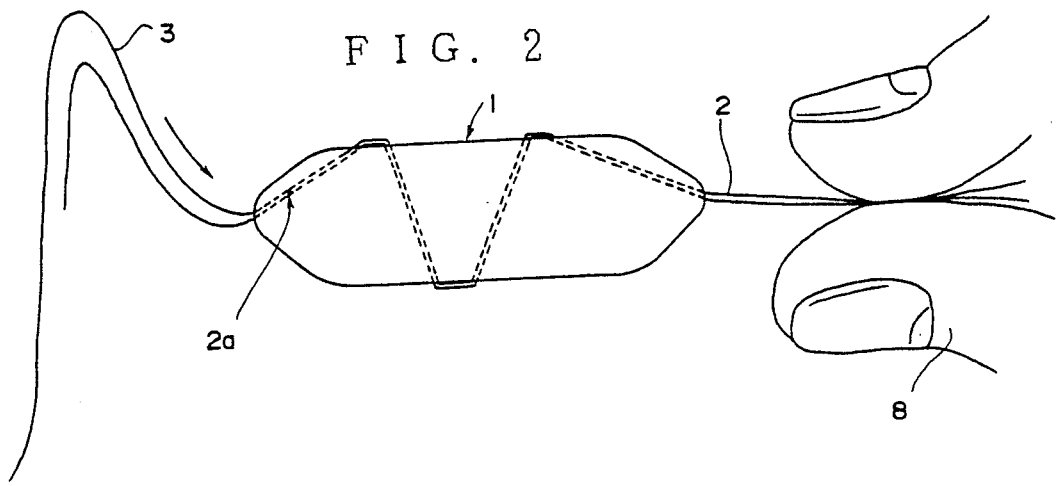
FIG. 2 is a front view which illustrates that a fishing line passes through the float body of the float in FIG. 1 with the aid of a guide line which is pulled by the fisherman's fingers.

FIG. 2 is a front view which shows that a fishing line 3 is being secured to the float of the present invention.

The foremost end of the fishing line 3 passes through the fishing line engagement portion 2a in the form of a loop and it is then folded back. The fisherman firmly holds the float body 1 with the fingers of one hand (not shown). At this time, he pulls the guide line 2 with fingers 8 of his other hand. This causes the fishing line 3 to be successively introduced through the through holes 1a, 1c, 1d and 1b to reach the apex of the conical portion 1e from which it in turn is drawn to the outside.

Figure 3:
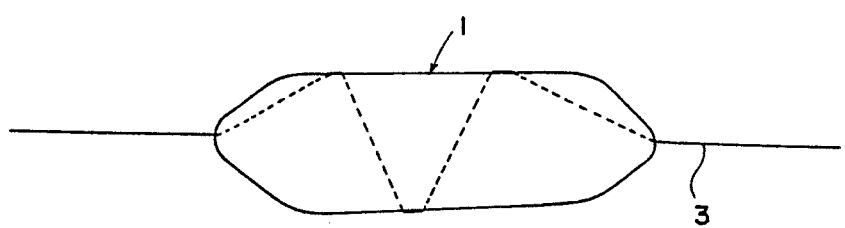
FIG. 3 is a front view of the float in FIG. 1 which illustrates that the fishing line is firmly secured to the float body of the float while extending therethrough.

FIG. 3 is a front view which shows that the fishing line 3 has been fully inserted through the float 1. As is apparent from the drawing, since the fishing line 3 is introduced through the interior of the float body 1 in a zigzag fashion as represented by a dotted line, there is no possibility that the float body 1 would slidably move along the fishing line 3 when a fishing assembly (normally comprising a float, a weight, a hook and a bait) is thrown by him to reach a predetermined fishing zone. The position of the float can freely be adjusted freely by the fisherman pulling the float body 1 with one hand while firmly holding the fishing line 3 with the other hand.

Figure 4A:
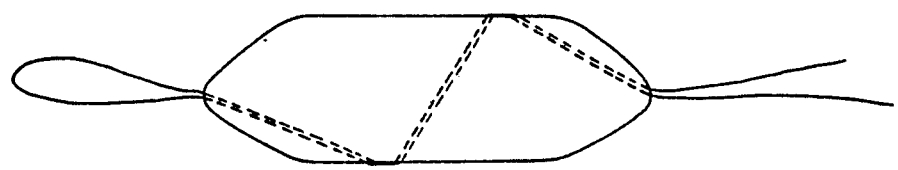
FIG. 4(a) is a front view of a float in accordance with an other embodiment of the present invention, particularly illustrating that a guide line is inserted through the float body of the float while assuming a two-line arrangement.
Figure 4B:
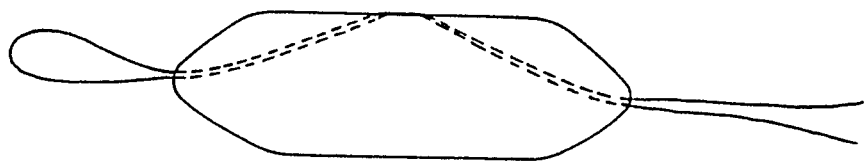
FIG. 4(b) is a front view of a float in accordance with still another embodiment of the present invention, particularly illustrating that a guide line is inserted through the float body of the float while assuming a two-line arrangement.
Figure 6A:
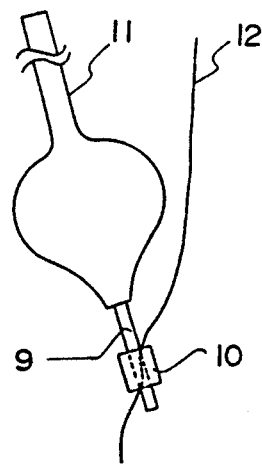
FIGS. 6(a) to (d) illustrate conventional floats or markers for a fishing operation.
Figure 6B:
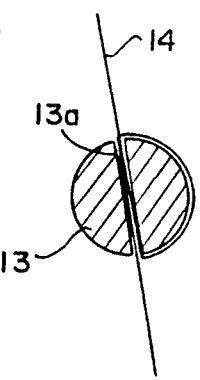
Figure 6C:
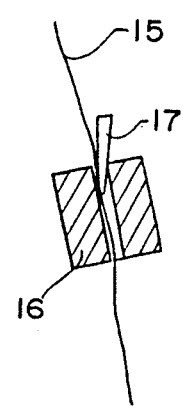
Figure 6D:
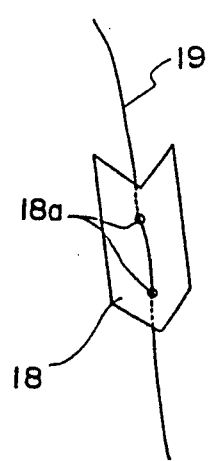

The present invention has been described above as to the embodiment wherein four through holes are formed through the float body 1. However, the present invention is not so limited. Alternatively, modification may be made such that only a single through hole is formed through the cylindrical portion of the float body (see FIG. (a)). Further, modification may be made such that no through hole is formed through the cylindrical portion of the float body but two or three holes are formed slantwise between the apex of the cylindrical portion of the float body and the middle part on the peripheral surface of the cylindrical portion of the same (see FIG. 4(b)). Even with such modifications, the advantageous effects mentioned above are assured.

Figure 5A:
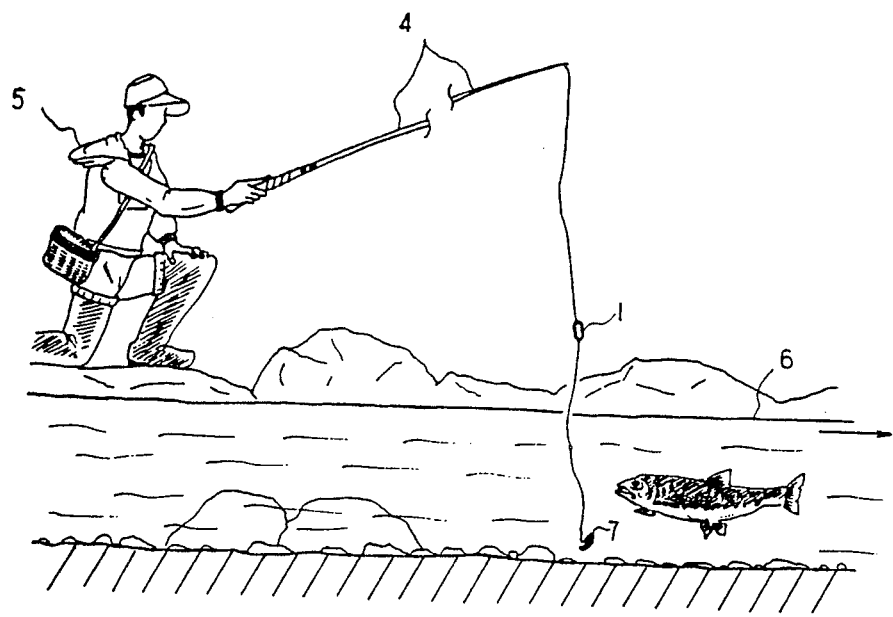
FIGS. 5(a) and (b) illustrate a fisherman enjoying a mountain stream fishing operation using the float of the present invention.
Figure 5B:
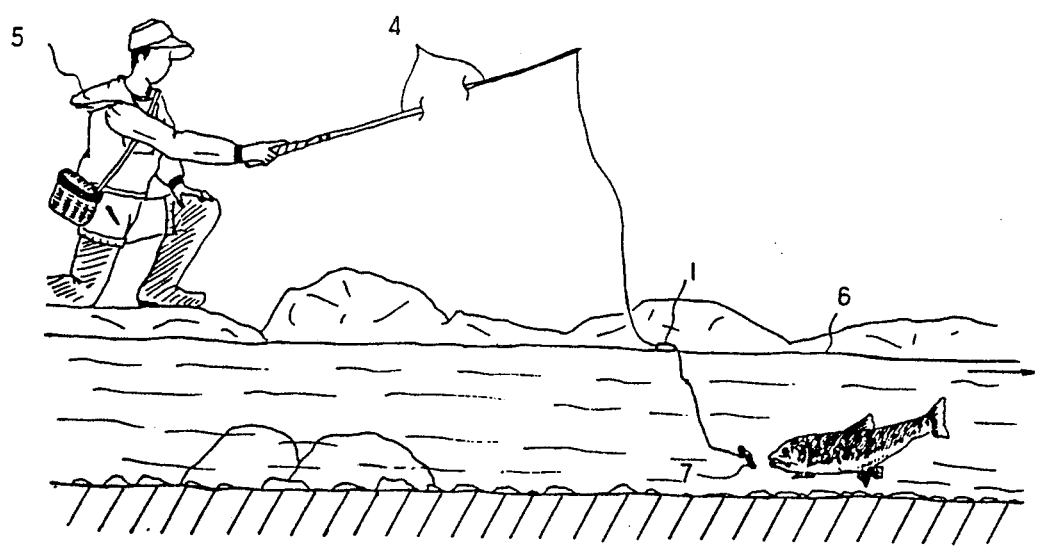

FIGS. 5(a) and 5(b) show by way of example a fisherman enjoying fishing in a mountain stream while using the float of the present invention, respectively.

Specifically, FIG. 5(a) illustrates a method of fishing by adjusting the position of a float 1 by actuating a fishing rod 4 such that the float 1 is located above the surface of a mountain stream. According to this fishing method, the position of the float 1 can properly be controlled by the fishing rod 4 when the fishing assembly (normally comprising a float, a weight, a hook and a bait) flows on the mountain stream. This fishing method is preferably employed in fishing for char or similar mountain fish.

FIG. 5(b) illustrates a fishing method in which the upward/downward movement of the float 1 caused by a fish in the water while floating the float 1 on the surface of the mountain stream is usually observed. This fishing method is preferably employed in fishing for trout or similar mountain fish.

As will be apparent from the above description, according to the present invention, the float includes conical end portions at opposite ends of a float body and a cylindrical portion, and a guide line previously passed through the float body with a two-line arrangement. While the foremost end of a fishing line is engaged with a small loop at the foremost end of the guide line, the fisherman pulls the guide line with one hand with the float body firmly held with the other hand. This enables the fishing line to pass through a plurality of through holes in the float body. Therefore, the float of the present invention makes it very easy for the fishing line to be firmly secured to the float body. In addition, it is also easy for a fisherman to properly adjust the position where the fishing line is to be secured to the float body.

While the present invention has been described above with respect to a few preferred embodiments thereof, it should of course be understood that the present invention should not be limited only to these embodiments but various changes or modifications may be made without departure from the scope of the invention as defined by the appended claims.

What is claimed is:

1. A float for a fishing operation comprising:
    a column-shaped float body molded of a spongy light synthetic resin and having a cylindrical peripheral surface, conical end portions projecting outward from opposite ends thereof and a longitudinal axis extending through an apex of each of said conical end portions;
    at least a first through hole and a second through hole, said first through hole extending slantwise from the apex of one of said conical end portions to the cylindrical peripheral surface of the float body, said second through hole extending slantwise from the apex of the other of said conical end portions to the cylindrical peripheral surface of the float body, said first and second through holes intersecting the peripheral surface of said float body at first and second points on the same side of said longitudinal axis, said first and second points being in the vicinity of each other; and
    a guide line folded back to assume a two-line arrangement while forming a small loop at a foremost end thereof, said guide line being inserted through said first through hole and said second through hole until said loop is projected outward of the apex of the other conical end portion so that a foremost end of a fishing line is engaged with the loop of the guide lines, said fishing line being introduced through the first and second through holes by pulling the guide line, whereby the fishing line is fixedly secured to the float at a required position.

2. The float as claimed in claim 1, wherein said cylindrical column-shaped float body is colored with a readily visually sensible color.

3. The float as claimed in claim 1 wherein said spongy light synthetic resin is a porous styrene resin.

4. A float for a fishing operation comprising:
    a cylindrical column-shaped float body having conical end portions projecting outward form opposite ends thereof, and a longitudinal axis extending through the apex of each of said conical end portions;
    a first through hole extending slantwise with respect to said longitudinal axis from the apex of one conical end portion to a first point on the cylindrical peripheral surface of the float body;
    a second through hole extending slantwise with respect to said longitudinal axis from the apex of the other conical end portion to a second point on the cylindrical peripheral surface of the float body;
    a third through hole extending through said cylindrical column-shaped float body to points on the cylindrical peripheral surface of said float body in the vicinity of said first and second points, said first and second through holes extending from respective apexes of said conical end portions to first and second points on the same side of said longitudinal axis; and wherein said third through hole has a first portion extending from the vicinity of said first point, through said cylindrical column-shaped float body, to a third point on the cylindrical peripheral surface of said float body on the opposite side of said longitudinal axis; said third through hole also having a second portion extending from the vicinity of said third point through said cylindrical column-shaped float body to the vicinity of said second point; and
    a guide line folded back to assume a two-line arrangement while forming a small loop at a foremost end thereof, said guide line being inserted sequentially through said first, third and second through holes until said loop is projected outward of the apex of the other conical end portion so that a foremost end of a fishing line is engaged with the loop of the guide lines, said fishing line being introduced through the first, third and second through holes by pulling the guide line, whereby the fishing line is fixedly secured to the float at a required position.

5. The float as claimed in claim 4 wherein said float body is molded of a spongy light synthetic resin.

6. The float as claimed in claim 5 wherein said spongy light synthetic resin is a porous styrene resin.

* * * * *